（12）United States Patent
Tang et al.

(10) Patent No.: US 12,544,071 B2
(45) Date of Patent: Feb. 10, 2026

(54) SURGICAL STAPLER

(71) Applicant: EziSurg Medical Co., Ltd., Shanghai (CN)

(72) Inventors: Chuangang Tang, Shanghai (CN); Guang Yang, Shanghai (CN); Mengmeng Guo, Shanghai (CN); Honglin Nie, Shanghai (CN); Hanbing Jiao, Shanghai (CN); Jun Yin, Shanghai (CN)

(73) Assignee: EziSurg Medical Co., Ltd., Shanghai (CN)

( * ) Notice: Subject to any disclaimer, the term of this patent is extended or adjusted under 35 U.S.C. 154(b) by 0 days.

(21) Appl. No.: 18/827,491

(22) Filed: Sep. 6, 2024

(65) Prior Publication Data

US 2025/0082326 A1 Mar. 13, 2025

(30) Foreign Application Priority Data

Sep. 7, 2023 (CN) .......................... 202311147289.5

(51) Int. Cl.
*A61B 17/00* (2006.01)
*A61B 17/072* (2006.01)

(52) U.S. Cl.
CPC .................. *A61B 17/07207* (2013.01); *A61B 2017/00398* (2013.01); *A61B 2017/07271* (2013.01)

(58) Field of Classification Search
CPC .... A61B 17/07207; A61B 2017/00398; A61B 2017/07271
USPC ................................ 227/175.1–182.1, 8, 19
See application file for complete search history.

(56) References Cited

U.S. PATENT DOCUMENTS

| 5,607,449 A | * | 3/1997 | Tontarra | A61B 17/29 606/208 |
| 5,653,721 A | * | 8/1997 | Knodel | A61B 17/07207 606/151 |
| 6,582,451 B1 | * | 6/2003 | Marucci | A61B 17/29 606/207 |

(Continued)

FOREIGN PATENT DOCUMENTS

| AU | 2011307338 A1 * | 4/2013 | ......... A61B 18/1445 |
| CA | 3056106 A1 * | 4/2020 | ....... A61B 17/07207 |

(Continued)

OTHER PUBLICATIONS

Extended European Search Report and Written Opinion dated Feb. 10, 2025 from corresponding EP Application No. 24198816.1.

*Primary Examiner* — Robert F Long
(74) *Attorney, Agent, or Firm* — ArentFox Schiff LLP

(57) ABSTRACT

Provided is a surgical stapler. The staple includes a knife holder, a first elastic member, jaws, and a housing assembly. The jaws are connected to the housing assembly. The first elastic member is disposed in the housing assembly. The knife holder is movable between a first position and a second position. The knife holder restricts the closure of the jaws when the knife holder is in the first position, and the jaws are configured to be closed when the knife holder is in the second position. The first elastic member is configured to drive the knife holder to move from the first position to the second position. The surgical stapler drives the knife holder to move by the first elastic member so that the knife holder no longer hinders the closing of the jaws, thereby facilitating user operation.

5 Claims, 7 Drawing Sheets

(56) References Cited

U.S. PATENT DOCUMENTS

| | | | |
|---|---|---|---|
| 8,764,769 B1* | 7/2014 | Rodriguez-Navarro | A61B 17/2833 600/114 |
| 9,161,807 B2* | 10/2015 | Garrison | A61B 18/1447 |
| 9,888,921 B2* | 2/2018 | Williams | A61B 17/105 |
| 2007/0068990 A1* | 3/2007 | Shelton, IV | A61B 17/07207 227/175.1 |
| 2009/0206137 A1* | 8/2009 | Hall | A61B 17/07207 227/176.1 |
| 2010/0076461 A1* | 3/2010 | Viola | A61B 17/0469 606/144 |
| 2011/0174099 A1* | 7/2011 | Ross | A61B 17/00 74/89.32 |
| 2014/0367447 A1* | 12/2014 | Woodard, Jr. | A61B 17/00234 227/176.1 |
| 2015/0173745 A1* | 6/2015 | Baxter, III | A61B 17/07207 227/176.1 |
| 2015/0173746 A1* | 6/2015 | Baxter, III | A61B 17/07207 227/176.1 |
| 2015/0209059 A1* | 7/2015 | Trees | A61B 18/1445 606/205 |
| 2016/0058439 A1* | 3/2016 | Shelton, IV | A61B 17/105 227/176.1 |
| 2018/0168647 A1* | 6/2018 | Shelton, IV | A61B 17/0644 |
| 2018/0296213 A1* | 10/2018 | Strobl | A61B 18/1445 |
| 2021/0002273 A1 | 1/2021 | Valentine et al. | |
| 2021/0022732 A1 | 1/2021 | Valentine et al. | |
| 2021/0059773 A1* | 3/2021 | Overmyer | A61B 34/30 |
| 2022/0378417 A1* | 12/2022 | Chen | A61B 17/00234 |
| 2022/0378423 A1* | 12/2022 | Chowaniec | A61B 17/07207 |
| 2023/0056912 A1* | 2/2023 | Williams | A61B 17/07207 |
| 2023/0277174 A1* | 9/2023 | Yang | A61B 17/072 227/176.1 |
| 2024/0000452 A1* | 1/2024 | Du | A61B 17/07207 |

FOREIGN PATENT DOCUMENTS

| | | | |
|---|---|---|---|
| CN | 203776973 U | 8/2014 | |
| CN | 105919641 A | 9/2016 | |
| CN | 106913362 A | 7/2017 | |
| CN | 111466981 A | 7/2020 | |
| CN | 114246623 A | 3/2022 | |
| EP | 3769698 A2 | 1/2021 | |
| EP | 3875040 A1 | 9/2021 | |
| EP | 4218611 A1 | 8/2023 | |
| IT | SS20000003 A1 | 11/2001 | |
| WO | 2001/085039 A1 | 11/2001 | |
| WO | 2003/079909 A2 | 10/2003 | |
| WO | WO-2012044606 A2 * | 4/2012 | A61B 18/1445 |
| WO | WO-2020088629 A1 * | 5/2020 | A61B 90/08 |
| WO | 2022/110250 A1 | 6/2022 | |

* cited by examiner

SURGICAL STAPLER

CROSS-REFERENCE TO RELATED APPLICATION

The present application claims priority to Chinese Patent Application No. 2023111472895, filed with the China National Intellectual Property Administration (CNIPA) on Sep. 7, 2023, the disclosure of which is incorporated herein by reference in its entirety.

TECHNICAL FIELD

The present disclosure relates to the technical field of medical devices, in particular, a surgical stapler.

BACKGROUND

A surgical stapler is a medical device used as an alternative to traditional manual suturing of wounds. Surgical staplers are widely used for tissue suturing and cutting in surgical procedures. However, the inventor has found that due to problems related to manufacturing, design, or improper operation by users, existing surgical staplers may sometimes fail to allow the jaws to close smoothly, thereby affecting the normal operation of the surgical staplers. More specifically, in the case of powered surgical staplers, when the motor malfunctions and fails to operate, and if the knife holder happens to be in a position that obstructs the jaws, an example is described in Chinese Patent Application No. CN202011004778.1. In the patent, the knife holder is in a retracted position, and the limiting protrusion of the knife holder abuts against the proximal end of the staple cartridge assembly, preventing the staple cartridge from moving. In such cases, the jaws cannot close, and the surgical stapler cannot be smoothly removed from the body. To resolve this, the rack needs to be manually pushed to drive the central rod and knife holder, thereby releasing the restriction imposed by the knife holder on the jaws and allowing the jaws to close. This would enable the surgical stapler to be removed from the body (through a trocar). However, this method is cumbersome and inconvenient for surgeons to perform. Alternatively, the incision may be enlarged to keep the surgical stapler jaws open and remove the surgical stapler from the body, but this method increases patient trauma and is detrimental to the patient's recovery.

Therefore, there is a need in this field for a surgical stapler that can eliminate or at least mitigate all or some of the preceding deficiencies in the related art.

SUMMARY

To overcome at least one of the deficiencies described in the related art, the objective of the present disclosure is to provide a surgical stapler that addresses the problem in the related art where, if a surgical stapler's jaw section is inside the body and the motor fails, the knife holder of the surgical stapler may restrict the closure of the jaws, thus preventing the surgical stapler from being removed from the body and complicating the manual operation of closing the jaws.

One of the objectives of the present disclosure is to provide a surgical stapler. The staple includes a knife holder, a first elastic member, jaws, and a housing assembly. The jaws are connected to the housing assembly. The first elastic member is disposed in the housing assembly. The knife holder is movable between a first position and a second position. The knife holder restricts the closure of the jaws when the knife holder is in the first position, and the jaws are configured to be closed by external force when the knife holder is in the second position. When the knife holder is in the first position, the first elastic member is configured to drive the knife holder to move from the first position to the second position.

Optionally, the surgical stapler includes a driving device, a rack, and a first gear; the first gear is connected to the driving device, the rack is connected to the knife holder, and the first gear is movable between an engaged position and a disengaged position; when the first gear is in the engaged position, the first gear engages with the rack, and the driving device drives the knife holder to move via the first gear and the rack; and when the first gear is in the disengaged position, the first gear disengages from the rack, and the first elastic member drives the knife holder to move from the first position to the second position.

Optionally, when the first gear is in the engaged position, the rack and the knife holder are locked by the driving device to restrict the first elastic member from driving the knife holder to move from the first position to the second position.

Optionally, when the knife holder is in the first position, the first gear is driven to move from the engaged position to the disengaged position to release the locking of the rack and the knife holder by the driving device so that the first elastic member is configured to drive the knife holder to move from the first position to the second position, where when the knife holder is in the first position, the first elastic member is in a compressed state, and when the knife holder is in the second position, the first elastic member is in a natural state.

Optionally, the surgical stapler includes a clutch mechanism; the clutch mechanism drives the first gear to move from the engaged position to the disengaged position by force, causing the first gear to disengage from the rack.

Optionally, the surgical stapler includes a second elastic member configured to drive the first gear to move to the engaged position.

Optionally, the surgical stapler includes a first connection block and a central rod; the proximal end of the central rod is connected to the rack, the distal end of the central rod is connected to the proximal end of the first connection block, and the distal end of the first connection block is connected to the knife holder through a second connection block; the proximal end of the first elastic member abuts against the housing assembly, and the distal end of the first elastic member abuts against the first connection block.

Optionally, the knife holder is movable back and forth among the first position, the second position, and a third position, the first position, the second position, and the third position are arranged sequentially from proximal end to distal end, and when the knife holder moves from the second position to the third position, a cutting knife on the knife holder cuts tissue disposed in the jaws.

Optionally, the jaws include an anvil and a staple cartridge assembly, the proximal end of the anvil is rotatably connected to the proximal end of the staple cartridge assembly, and the proximal end of the anvil and the proximal end of the staple cartridge assembly are connected to the housing assembly.

Optionally, the knife holder forms a limiting protrusion, when the knife holder is in the first position, the limiting protrusion abuts against the staple cartridge assembly to restrict the closure of the jaws, and when the knife holder is in the second position, the limiting protrusion disengages from the staple cartridge assembly, allowing the jaws to be closed by the external force.

The present disclosure provides a surgical stapler. A knife holder is driven to move by a first elastic member so that the knife holder no longer hinders the closing of the jaws, thereby facilitating user operation.

Figure 1:
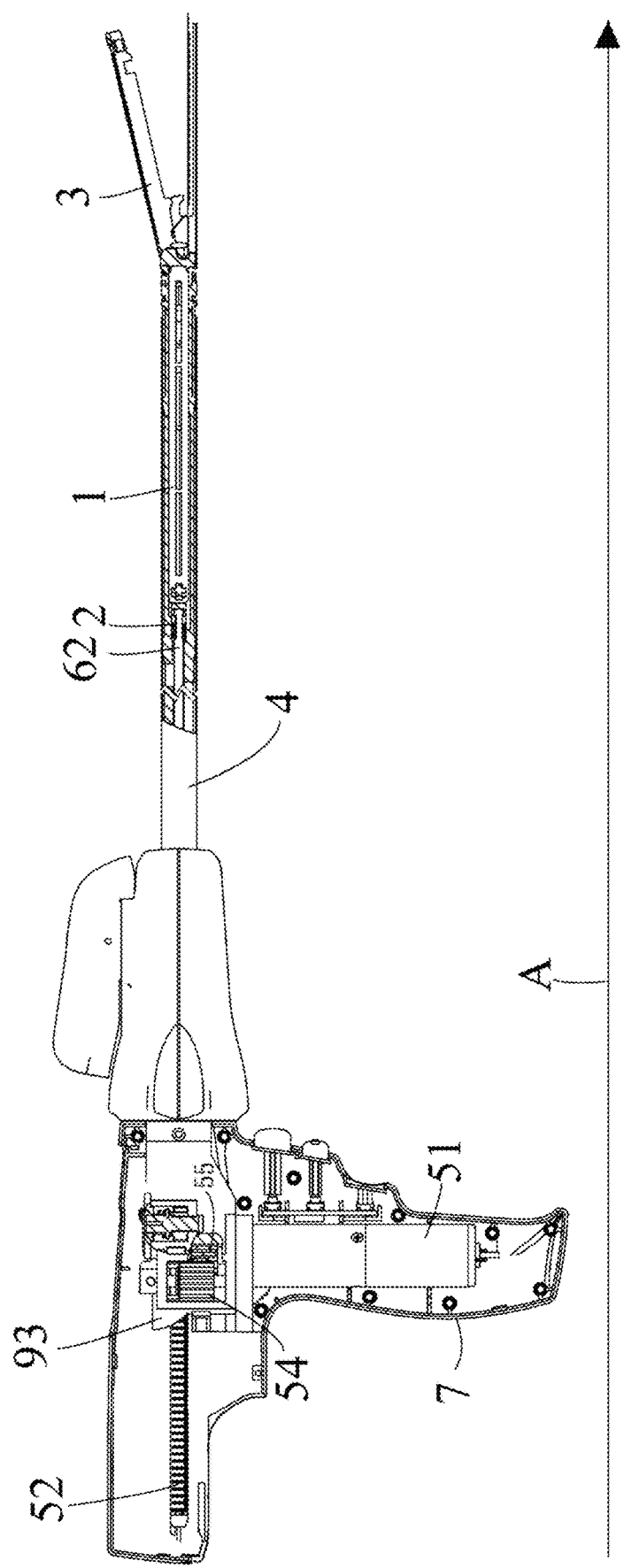
FIG. 1 is a sectional view of a surgical stapler according to the present disclosure.

REFERENCE LIST 1 knife holder
110 main knife holder
120 limiting protrusion
121 abutment surface
130 knife rod mounting slot
2 first elastic member
3 jaws
32 anvil
33 staple cartridge assembly
330 contact part
4 housing assembly
41 outer sleeve
421 first part
422 second part
51 driving device
52 rack
54 first gear
55 second gear
56 second elastic member
61 first connection block
611 first mounting slot
612 second mounting slot
62 central rod
621 limiting part
63 second connection block
7 handle
A first direction

DETAILED DESCRIPTION

For better understanding and implementation, technical solutions in embodiments of the present disclosure will be described clearly and completely in conjunction with drawings in the embodiments of the present disclosure.

In the description of the present disclosure, it is to be noted that orientations or position relations indicated by terms such as "upper", "lower", "front", "back", "left", "right", "vertical", "horizontal", "top", "bottom", "inside", "outside", "far", and "near" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure.

Unless otherwise defined, all technical and scientific terms used herein have meanings the same as those commonly understood by those skilled in the art to which the present disclosure pertains. Terms used in the specification of the present disclosure are only used for describing embodiments and not intended to limit the present disclosure.

It is emphasized herein that unless otherwise stated, the terms used in the description are consistent with the commonly accepted meanings of various technical terms in the field, as defined in various technical dictionaries, textbooks, and other sources.

In this description, when expressing directions, the reference point is generally the instrument operator. The position relatively closer to the instrument operator is referred to as the "proximal end," while the position relatively farther from the instrument operator is referred to as the "distal end." Further, in this description, the length direction of the surgical stapler may be referred to as the axial direction.

Figure 3A:
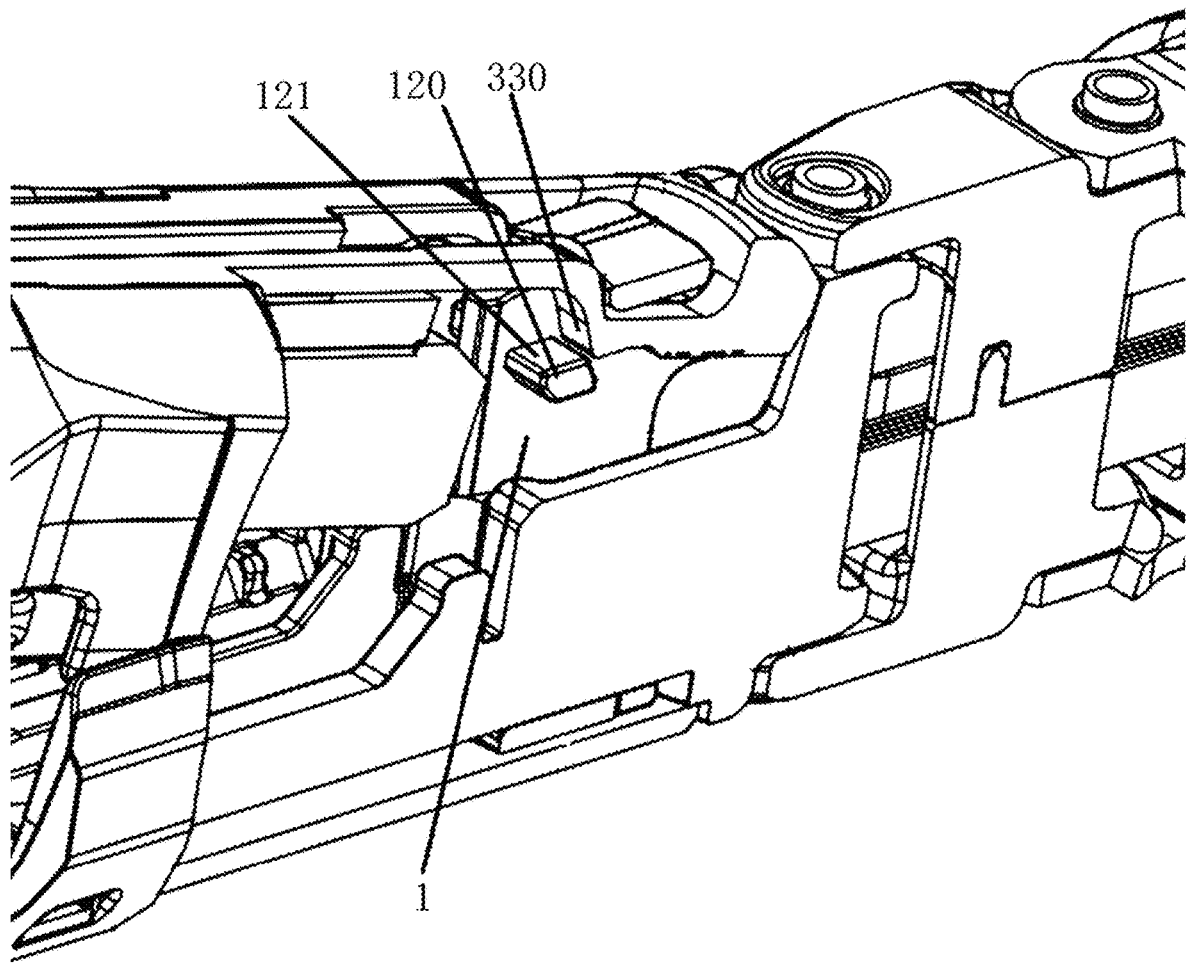
FIG. 3A is a view illustrating the partial structure of the surgical stapler.
Figure 3B:
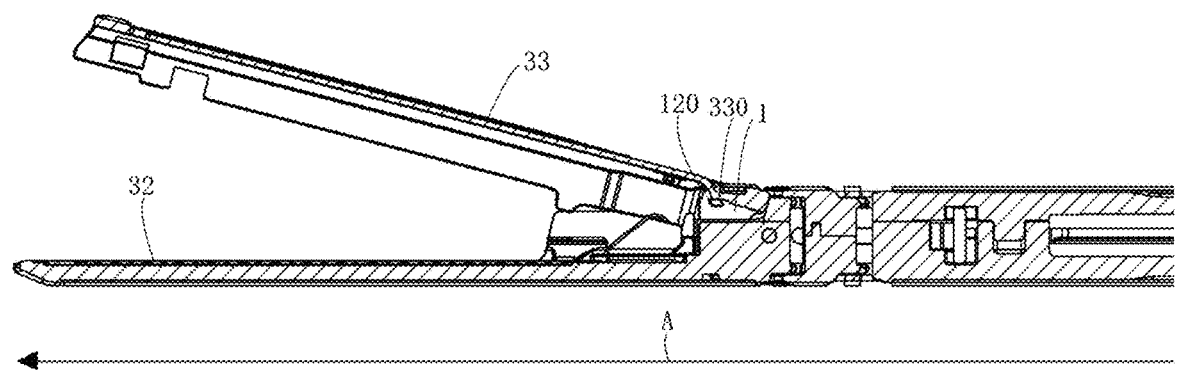
FIG. 3B is a view illustrating the partial structure of the surgical stapler when a knife holder is in a first position.
Figure 3C:
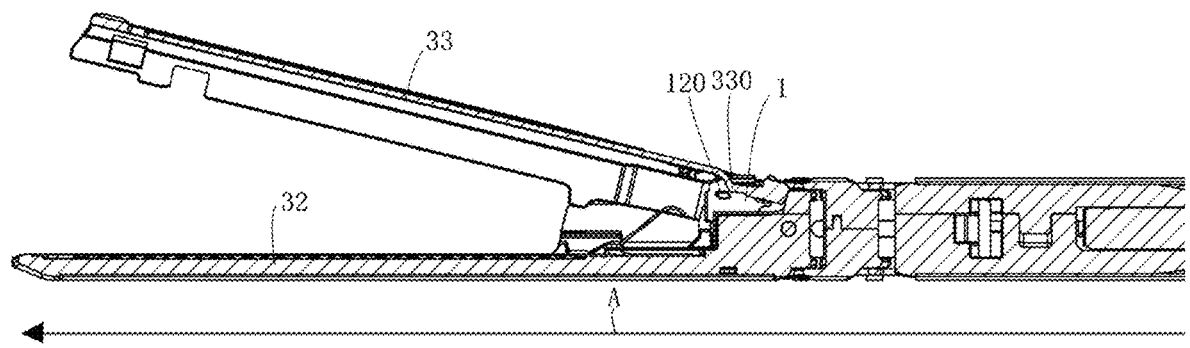
FIG. 3C is a view illustrating the partial structure of the surgical stapler when the knife holder is in a second position.
Figure 3D:
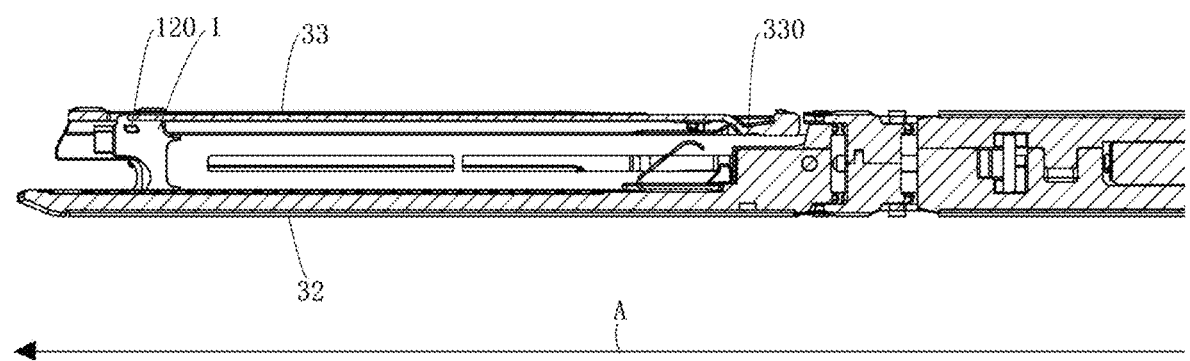
FIG. 3D is a view illustrating the partial structure of the surgical stapler when the knife holder is in a third position.

With reference to FIG. 1, the present disclosure provides a surgical stapler; the surgical stapler includes a knife holder 1, a first elastic member 2, jaws 3, and a housing assembly 4; the jaws 3 are connected to the housing assembly 4, the first elastic member 2 is disposed in the housing assembly 4, and the knife holder 1 is movable between a first position and a second position. When the knife holder 1 is in the first position, the knife holder 1 restricts the closure of the jaws 3, as shown in FIG. 3B. When the knife holder 1 is in the second position, as shown in FIG. 3C, the jaws 3 are configured to be closed by external force; the first elastic member 2 is configured to drive the knife holder 1 to move from the first position to the second position. It should be noted that normally, when the knife holder 1 is in the first position, the first elastic member 2 is in a compressed state; when the knife holder 1 is in the second position, the first elastic member 2 is in a natural state. Therefore, the first elastic member 2 can drive the knife holder 1 to move from the first position to the second position. Meanwhile, since the first elastic member 2 is in the natural state when the knife holder 1 is in the second position, the first elastic member 2 at this time does not restrict the knife holder 1 from moving back from the second position to the first position.

Figure 2:
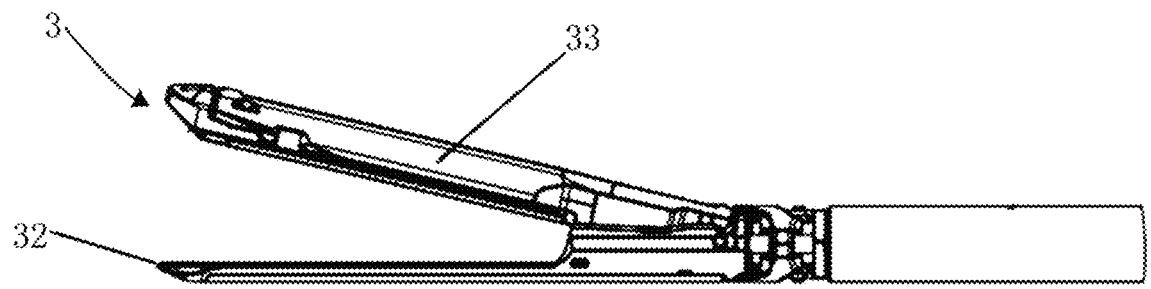
FIG. 2 is a view illustrating the partial structure of the jaws of the surgical stapler.
Figure 4:
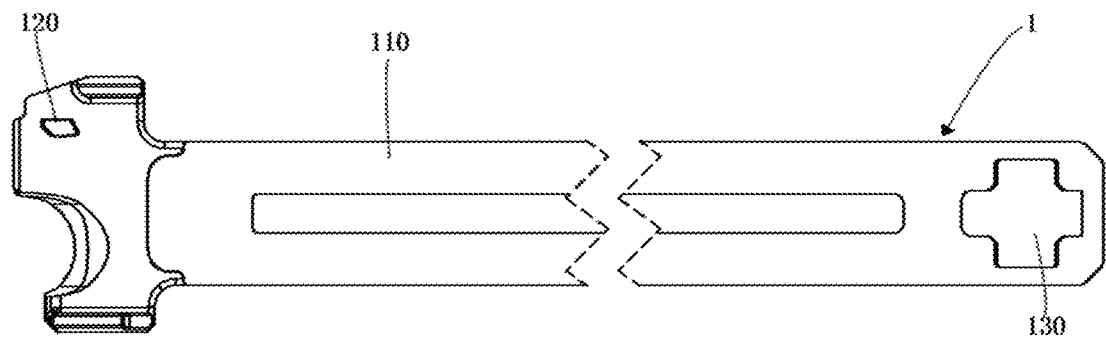
FIG. 4 is a view illustrating the structure of the knife holder of the surgical stapler.

Specifically, as shown in FIGS. 2 to 4, the knife holder 1 includes a main knife holder 110 and at least one limiting protrusion 120 disposed adjacent to the distal end of the main knife holder 110 and extending vertically outward from the main knife holder body 110 in a direction away from the main knife holder body 110. When the knife holder 1 is in the first position, the abutment surface 121 of the limiting protrusion 120 of the knife holder 1 abuts against the contact part 330 of the staple cartridge assembly 33 to stop the staple cartridge assembly 33, making the jaws 3 unable to continue to close, as shown in FIG. 3B. When the knife holder 1 leaves the first position, the limiting protrusion 120 of the knife holder 1 disengages from the staple cartridge assembly 33. At this time, the limiting protrusion 120 can no longer limit the rotation of the staple cartridge assembly 33 so that the jaws 3 can be closed, specifically as shown in FIG. 3C, where the abutment surface 121 is the top surface of the limiting protrusion 120. More specifically, the jaws 3 include an anvil 32 and a staple cartridge assembly 33, and the proximal end of the anvil 32 is rotatably connected to the proximal end of the staple cartridge assembly 33. When the jaws 3 are open, the distal end of the anvil 32 and the distal end of the staple cartridge assembly 33 are far away from each other; when the jaws 3 are closed, the distal end of the anvil 32 and the distal end of the staple cartridge assembly 33 are close to each other. When the staple cartridge assembly 33 begins to rotate relative to the anvil 32, the contact part 330 presses against the limiting protrusion 120 of the knife holder 1 in the first position to limit the relative rotation of the staple cartridge assembly 33 and the anvil 32. When the knife holder 1 moves distally to the second position, the limiting protrusion 120 of the knife holder 1 can no longer abut against the contact part 330 of the staple cartridge assembly 33. Therefore, at this time, the staple cartridge assembly 33 can rotate relative to the anvil 32, and the jaws 3 can be closed. It should be noted that the principle of the knife holder limiting the jaws may refer to the Chinese Patent Application Number CN202011004778.1.

For ease of understanding, the first direction A is marked in FIG. 1 and FIG. 3B to FIG. 3D, and the first direction A is from the proximal end to the distal end.

It should be noted that the staple cartridge assembly 33 and the anvil 32 are used to clamp the tissue, a staple cartridge is provided in the staple cartridge assembly 33, and staples may be provided in the staple cartridge. When the jaws 3 are closed, the staples are bent and shaped under the action of the knife holder 1, the staple cartridge assembly 33, and the anvil 32 to suture the tissues.

It should be noted that under normal circumstances, when the knife holder 1 moves between the first position and the second position, the cutting knife on the knife holder 1 does not cut the tissue inside the jaws 3 or cannot completely sever the tissue inside the jaws 3. The knife holder 1 needs to continue moving distally to completely sever the tissue inside the jaws 3. More specifically, the knife holder 1 has a cutting edge, and the knife holder is movable back and forth among the first position, the second position, and a third position; the first position, the second position, and the third position are arranged sequentially from proximal end to distal end, and when the knife holder 1 moves from the second position to the third position, the cutting edge on the knife holder 1 cuts the tissue located inside the jaws 3.

Figure 8A:
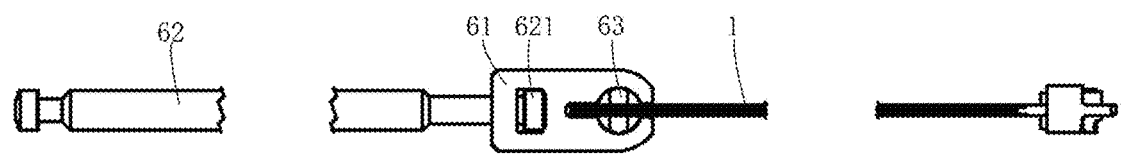
FIG. 8A is a diagram illustrating the structures of the knife holder, a first connection block, a second connection block, and a central rod.
Figure 8B:
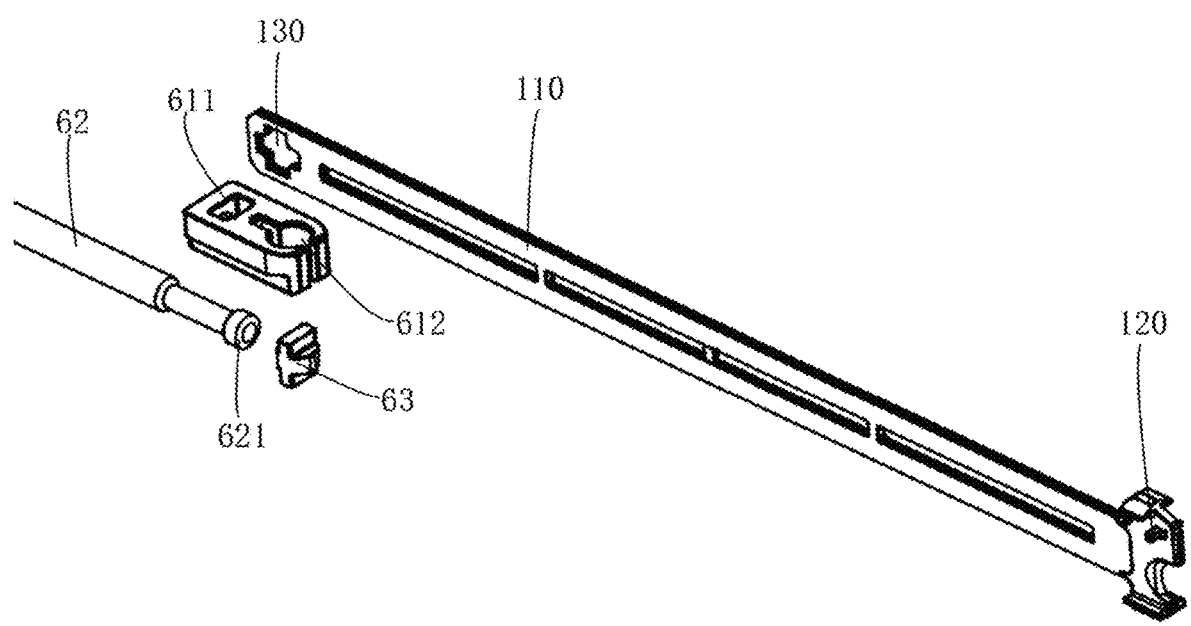
FIG. 8B is an exploded view of the knife holder, the first connection block, the second connection block, and the central rod.

Furthermore, the housing assembly 4 of the surgical stapler includes an outer sleeve 41 and an inner sleeve, the outer sleeve 41 is sleeved over the inner sleeve, the proximal end of the outer sleeve 41 and the proximal end of the inner sleeve are separately connected to the distal end of the surgical stapler's handle, and the distal end of the outer sleeve 41 and the distal end of the inner sleeve are separately connected to the jaws 3. More specifically, as shown in FIGS. 8A and 8B, the surgical stapler includes a first connection block 61 and a central rod 62; the proximal end of the central rod 62 is connected to the rack 52, the distal end of the central rod 62 is connected to the proximal end of the first connection block 61, and the distal end of the first connection block 61 is connected to the knife holder 1 through a second connection block 63; the proximal end of the first elastic member 2 abuts against the inner sleeve, and the distal end of the first elastic member 2 abuts against the first connection block 61. When the knife holder 1 is in the first position, the first connection block 61 cooperates with the inner sleeve to compress the first elastic member 2. The first elastic member 2 applies force to the first connection block 61, the central rod 62, and the knife holder 1 to drive the knife holder 1 to move to the second position. The distance that the first elastic member 2 drives the knife holder to move may be 1.3 mm or may range from 1 mm to 3 mm. It should be noted that the proximal end of the central rod 62 is disposed in the handle 7 and is connected to the rack 52, and the distal end of the central rod 62 is disposed in the inner sleeve and is connected to the knife holder 1. Specifically, a limiting part 621 of the central rod 62 is embedded in the first mounting slot 611 of the first connection block 61, and a knife rod mounting slot 130 of the knife holder 1 is embedded in a second mounting slot 612 of the first connection block 61 through the second connection block 63 so that when the central rod 62 moves, the first connection block 61 and the knife holder 1 are also driven to move. During assembly, the limiting part 621 of the central rod 62 may be inserted into the first mounting slot 611 from bottom to top; the second connection block 63 is first placed in the knife rod mounting slot 130 and then embedded into the second mounting slot 612 together with the proximal end of the knife holder 1, thereby connecting the central rod 62 to the knife holder 1.

It should be noted that the connection between the central rod 62 and the first connection block 61 may be either a fixed connection or a detachable connection and is not limited to the preceding connection methods. Similarly, the connection between the first connection block 61 and the knife holder 1 may be either a fixed connection or a detachable connection and is not limited to the preceding connection methods.

Figure 5:
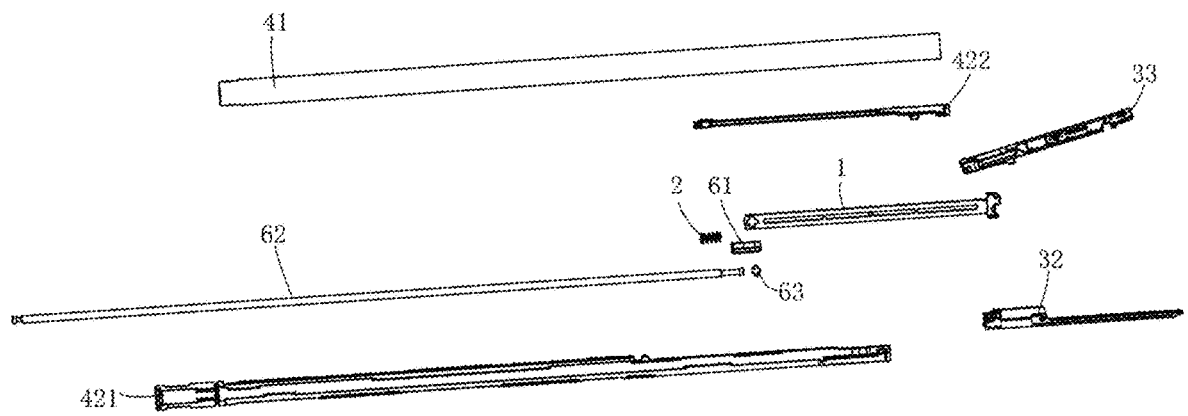
FIG. 5 is an exploded view of the partial structure of the surgical stapler.

As shown in FIG. 5, the inner sleeve is mainly divided into a first part 421 and a second part 422. It should be noted that the structures of the outer sleeve 41 and the inner sleeve may vary and are not limited to the structures described above. For example, in some embodiments, the outer sleeve 41 and the inner sleeve are an integral structure and cannot be separated.

Figure 6:
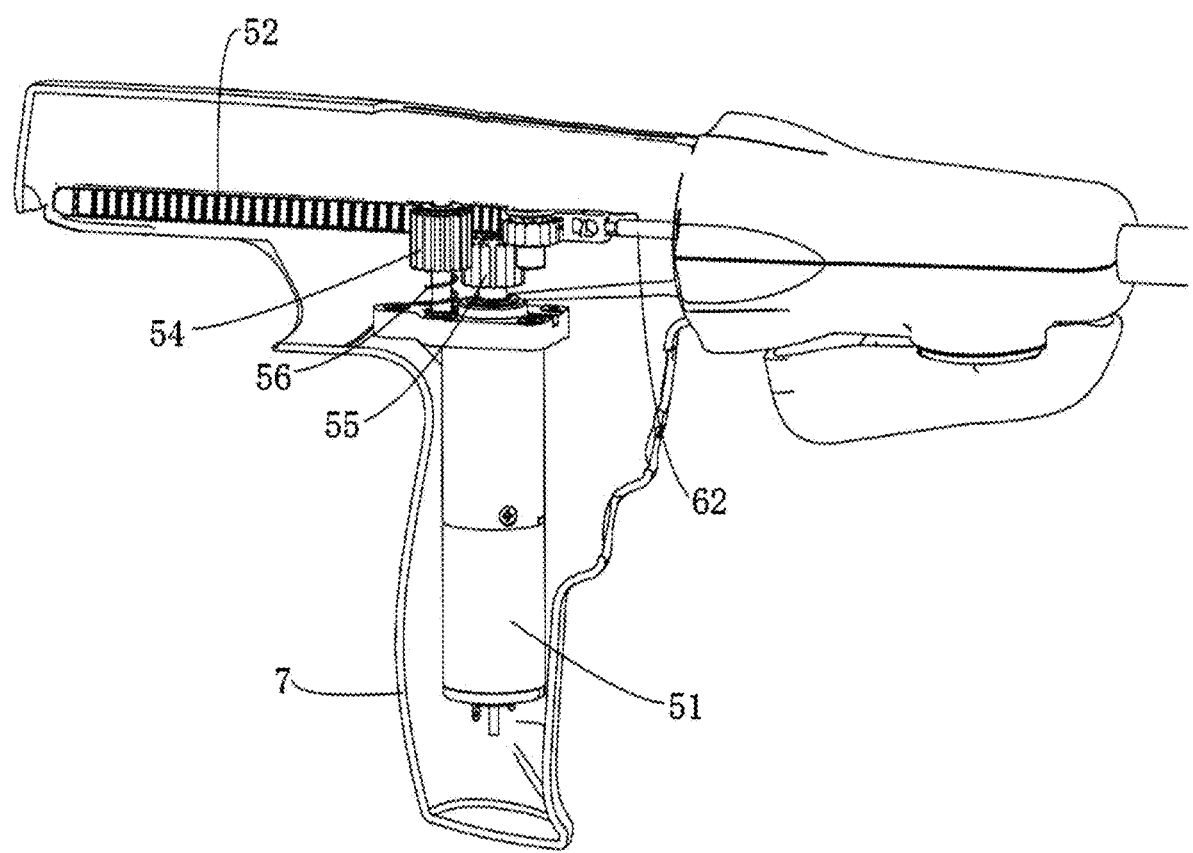
FIG. 6 is a partial sectional view of the partial structure of the surgical stapler.
Figure 7:
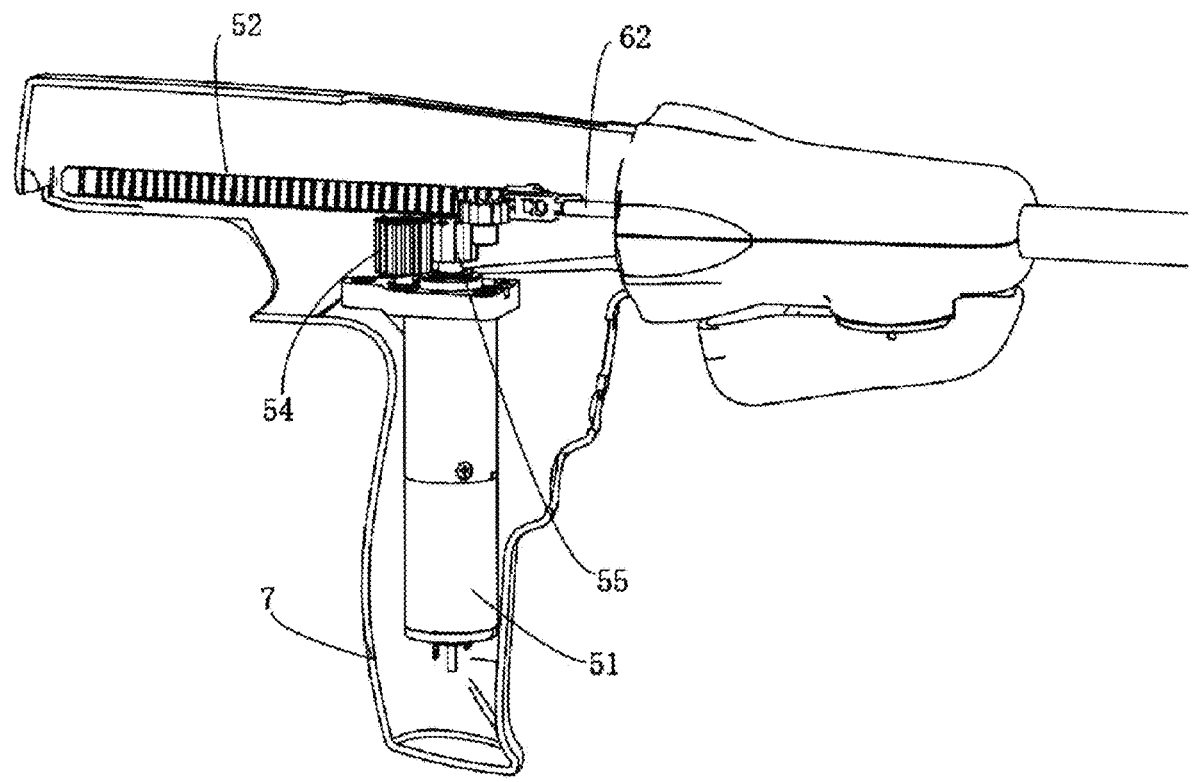
FIG. 7 is a partial sectional view of the structure shown in FIG. 6 in another state.

When the knife holder 1 is in the first position, although the knife holder 1 and the central rod 62 are subjected to the force of the first elastic member 2, the knife holder 1 does not move to the second position due to other external forces (such as the force provided by the driving device 51 that locks the movement of the knife holder 1 and the central rod 62). Optionally, the surgical stapler includes a clutch mechanism (not shown in the figures) that drives the first gear 54 from the engaged position to the disengaged position by force, causing the first gear 54 to disengage from the rack 52. Reference may be made to FIGS. 6 and 7. Specifically, the surgical stapler includes a driving device 51, a rack 52, and a first gear 54; the first gear 54 is connected to the driving device 51, the rack 52 is connected to the knife holder 1, and the first gear 54 is movable between an engaged position and a disengaged position; when the first gear 54 is in the engaged position, the first gear 54 engages with the rack 52, as shown in FIG. 6, and the driving device 51 can then drive the central rod 62 and the first connection block 61 to move axially through the first gear 54 and the rack 52, thus further driving the movement of the knife holder 1. When the first gear 54 is in the disengaged position, as shown in FIG. 7, the first gear 54 disengages from the rack 52, allowing the first elastic member 2 to drive the knife holder 1 from the first position to the second position. It should be additionally noted that when the first gear 54 is in the engaged position, due to the engagement between the first gear 54 and the rack 52, both the rack 52 and the knife holder 1 connected to the rack 52 are locked by the driving device 51 connected to the first gear 54. At this time, the knife holder 1 in the first position does not move to the second position.

In the preceding solution, since the driving device 51 performs transmission through the first gear 54 and the rack 52, the rack 52 and the knife holder 1 fixedly connected to the rack 52 cannot move when the driving device 51 is stopped and the first gear 54 and rack 52 are in the engaged position. Once the first gear 54 disengages from the rack 52, the driving device 51 no longer affects the rack 52 and cannot lock the movement of the rack 52. Thus, the locking of the rack 52 and knife holder 1 by the driving device 51 can be effectively released.

Specifically, the output end of the driving device 51 is provided with a second gear 55, the second gear 55 is engaged with the first gear 54, and the first gear 54 can engage with the rack 52. Therefore, when the output end of the driving device 51 rotates, the second gear 55 and the first gear 54 are driven to rotate, causing the rack 52, the central rod 62, the first connection block 61, and the knife holder 1 to move. Once the driving device 51 fails, the output end of the driving device 51 is locked and unable to rotate, and the first gear 54 and the second gear 55 are also unable to rotate. Moreover, the movement of the rack 52, the central rod 62, the first connection block 61, and the knife holder 1 are locked. Therefore, this solution is also provided with a clutch mechanism, through which the first gear 54 is pressed downwardly so that the first gear 54 disengages from the rack 52. At this time, the driving device 51 can no longer restrict the movement of the rack 52, the central rod 62, the first connection block 61, and the knife holder 1. As shown in FIG. 7, if the knife holder 1 is in the first position, the compressed first elastic member 2 drives the knife holder 1 to move from the first position to the second position.

Optionally, the surgical stapler includes a second elastic member 56 configured to drive the first gear to move to a position engaged with the rack 52. Specifically, when the first gear 54 is pressed downward, the second elastic member 56 is also compressed under force. When the first gear 54 is no longer pressed, the second elastic member 56 provides an upward force to the first gear 54 to return the first gear 54 to the position engaged with the rack 52. At this time, the first gear 54, the second gear 55, and the rack 52 resume transmission connection.

It should be noted that a guide shaft is formed inside the handle 7 to guide the movement of the first gear 54. In this embodiment, the guide shaft extends in the up-down direction, and the first gear 54 is sleeved outside the guide shaft to guide the first gear 54 to move only in the up-down direction.

Optionally, the driving device 51 is a motor.

Optionally, the first elastic member 2 and the second elastic member 56 are springs.

In the surgical stapler in the preceding embodiment, when a user drives the first gear 54 to move from the engaged position to the disengaged position, the locking of the rack 52 and knife holder 1 by the driving device 51 can be released. At this time, if the knife holder 1 is in the first position, the first elastic member 2 in the compressed state drives the knife holder 1 to move from the first position to the second position so that the limiting protrusion 120 on the knife holder 1 no longer restricts the closing of the jaws 3. The benefit of this solution is that the user only needs to move the first gear 54 to the disengaged position, and subsequently, the surgical stapler automatically moves the knife holder 1, without the need for manual operation by the user to drive the knife holder 1 to the second position. This solution greatly improves the convenience of the surgical stapler.

The surgical stapler in the present disclosure is particularly suitable for electric laparoscopic surgical staplers. Moreover, the surgical stapler has a simple structure and more convenient operation.

The technical means in the present disclosure are not limited to the technical means disclosed in the preceding embodiments, but also include technical solutions composed of any combination of the preceding technical features. It is to be noted that for those of ordinary skill in the art, a number of improvements and modifications can be made without departing from the principle of the present disclosure, and these improvements and modifications are within the scope of the present disclosure.

What is claimed is:

1. A surgical stapler, comprising:
a knife holder, a first elastic member, jaws, and a housing assembly,
wherein the jaws are connected to the housing assembly, the first elastic member is disposed in the housing assembly, and the knife holder is movable between a first position and a second position;
wherein when the knife holder is in the first position, the knife holder restricts a closure of the jaws and when the knife holder is in the second position, the jaws are configured to be closed by external force; and
wherein when the knife holder is in the first position, the first elastic member is configured to drive the knife holder to move from the first position to the second position,
wherein the surgical stapler further comprises:
a first connection block, a central rod, a driving device, a rack, a first gear, and a second elastic member,
wherein a proximal end of the central rod is connected to the rack, a distal end of the central rod is connected to a proximal end of the first connection block, and a distal end of the first connection block is connected to the knife holder, wherein a proximal end of the first elastic member abuts against the housing assembly, and a distal end of the first elastic member abuts against the first connection block;
wherein the first gear is connected to the driving device, the rack is connected to the knife holder, and the first gear is movable between an engaged position and a disengaged position; when the first gear is in the engaged position, the first gear engages with the rack, and the driving device drives the knife holder to move via the first gear and the rack; and when the first gear is in the disengaged position, the first gear disengages from the rack, and the first elastic member drives the knife holder to move from the first position to the second position; and
wherein the second elastic member is connected to the first gear and the output end of the driving device, the second elastic member is configured to drive the first gear to move to the engaged position;
wherein the driving device is configured to drive the central rod and the first connection block to move axially through the first gear and the rack for driving the movement of the knife holder and the rack, the central rod and the first connection block are arranged along the same axial direction, wherein the jaws comprise an anvil and a staple cartridge assembly, a proximal end of the anvil is rotatably connected to a proximal end of the staple cartridge assembly, and the proximal end of the anvil and the proximal end of the staple cartridge assembly are connected to the housing assembly, wherein the knife holder forms a limiting protrusion, when the knife holder is in the first position, the limiting protrusion abuts against the staple cartridge assembly to restrict the closure of the jaws, and when the knife holder is in the second position, the limiting protrusion disengages from the staple cartridge assembly, allowing the jaws to be closed by the external force, and length direction of the surgical stapler is referred to as an axial direction, and the movement from the first position to the second position of the knife holder is aligned along the axial direction, as with the movement imparted onto the knife holder by the rack and the driving device.

2. The surgical stapler of claim 1, wherein when the first gear is in the engaged position, the rack and the knife holder are locked by the driving device to restrict the first elastic member from driving the knife holder to move from the first position to the second position.

3. The surgical stapler of claim 2, wherein when the knife holder is in the first position, the first gear is driven to move from the engaged position to the disengaged position to release locking of the rack and the knife holder by the driving device, and to cause the first elastic member to drive the knife holder to move from the first position to the second position, wherein when the knife holder is in the first position, the first elastic member is in a compressed state, and when the knife holder is in the second position, the first elastic member is in a natural state.

4. The surgical stapler of claim 2, comprising a clutch mechanism, wherein the clutch mechanism drives the first gear to move from the engaged position to the disengaged position by force, causing the first gear to disengage from the rack.

5. The surgical stapler of claim 1, wherein the knife holder is movable back and forth among the first position, the second position, and a third position, the first position, the second position, and the third position are arranged sequentially from proximal end to distal end, and when the knife holder moves from the second position to the third position, a cutting knife on the knife holder cuts tissue disposed in the jaws.

* * * * *